(12) United States Patent
Yarino

(10) Patent No.: US 9,410,515 B2
(45) Date of Patent: Aug. 9, 2016

(54) FUEL INJECTION APPARATUS FOR INTERNAL COMBUSTION ENGINE

(75) Inventor: Motonari Yarino, Mishima (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 193 days.

(21) Appl. No.: 14/115,794

(22) PCT Filed: May 10, 2012

(86) PCT No.: PCT/IB2012/000900
§ 371 (c)(1),
(2), (4) Date: Nov. 5, 2013

(87) PCT Pub. No.: WO2012/153178
PCT Pub. Date: Nov. 15, 2012

(65) Prior Publication Data
US 2014/0137842 A1    May 22, 2014

(30) Foreign Application Priority Data
May 12, 2011 (JP) ................... 2011-107302

(51) Int. Cl.
*F02M 51/06* (2006.01)
*F02B 23/10* (2006.01)
*F02M 61/14* (2006.01)
(Continued)

(52) U.S. Cl.
CPC ............. *F02M 51/06* (2013.01); *F02B 23/104* (2013.01); *F02M 61/14* (2013.01); *F02M 61/1813* (2013.01); *F02B 2023/103* (2013.01);
(Continued)

(58) Field of Classification Search
CPC ..... Y02T 10/123; Y02T 10/44; F02B 17/005; F02B 2023/103; F02B 23/0669; F02M 61/1806; F02M 61/1813; F02M 69/045

USPC ......... 123/472, 445, 446, 452, 455, 457, 490, 123/511

See application file for complete search history.

(56) References Cited

U.S. PATENT DOCUMENTS 6,820,861 B2 * 11/2004 Bruzek ................... 254/93 H
6,907,857 B2 * 6/2005 Saito .................... F02D 35/023
123/179.16

(Continued)

FOREIGN PATENT DOCUMENTS

CN    1948734 A    4/2007
EP    1 775 439 A1   4/2007
JP    2005-054733 A  3/2005

OTHER PUBLICATIONS

International Search Report for corresponding International Patent Application No. PCT/IB2012/000900 mailed Sep. 19, 2012.

*Primary Examiner* — Lindsay Low
*Assistant Examiner* — Long T Tran
(74) *Attorney, Agent, or Firm* — Sughrue Mion, PLLC

(57) ABSTRACT

A fuel injection valve (21) is provided with a plurality of injection holes (25) arranged at intervals in a lateral direction, when a direction in which a central axis (CL) of the cylinder (2) extends is a vertical direction, so that the plurality of injection holes (25) are directed radially. The plurality of injection holes (25) are configured such that, when an angle formed between two adjacent injection axes, among a plurality of injection axes (Axf) defining the respective injection directions of the injection holes, is an included angle, the included angle ($\theta_1$) formed by two injection axes closest to the central axis of the cylinder (2) is the smallest of all the included angles ($\theta_1$, $\theta_2$, $\theta_3$).

1 Claim, 5 Drawing Sheets

(51) Int. Cl.
  *F02M 61/18* (2006.01)
  *F02B 75/12* (2006.01)
(52) U.S. Cl.
  CPC .......... *F02B2075/125* (2013.01); *Y02T 10/123* (2013.01); *Y02T 10/125* (2013.01)

(56) References Cited

U.S. PATENT DOCUMENTS

| | | | | |
|---|---|---|---|---|
| 6,920,861 B2 * | 7/2005 | Hayakawa | ......... | F02M 51/0671 123/295 |
| 7,278,393 B2 * | 10/2007 | Hayakawa | ............ | F02B 23/104 123/294 |
| 2004/0159721 A1 * | 8/2004 | Shiraishi | ............... | F02B 17/005 239/533.12 |
| 2005/0028784 A1 | 2/2005 | Kubo et al. | | |
| 2007/0079797 A1 | 4/2007 | Kihara et al. | | |
| 2008/0196691 A1 * | 8/2008 | Kihara | .................. | F02B 23/104 123/299 |
| 2009/0235897 A1 * | 9/2009 | Fujikawa | ............... | F02B 23/104 123/305 |

* cited by examiner

FUEL INJECTION APPARATUS FOR INTERNAL COMBUSTION ENGINE

BACKGROUND OF THE INVENTION

1. Field of the Invention

The invention relates to a fuel injection apparatus for an internal combustion engine, which includes a fuel injection valve that injects fuel into a cylinder.

2. Description of Related Art

Japanese Patent Application Publication No. 2005-54733 (JP 2005-54733 A) describes a fuel injection apparatus including a fuel injection valve that has a multi-hole nozzle. The fuel injection apparatus according to JP 2005-54733 A uses, under a condition that a momentum of a piston is low, a characteristic that when an inter-spray distance is short and a fuel pressure is high, a fuel density in a space downstream of the multi-hole nozzle in an injection direction becomes high and a penetration of a group of fuel sprays as a whole increases.

In general, spray characteristics depend on specifications specific to each nozzle such as an injection hole shape, a spray spread angle, and an injection direction. Some of the characteristics vary depending on a fuel pressure. However, it is difficult to change the spray pattern with the fuel pressure. Namely, it is difficult to selectively form different spray patterns such as a hollow spray pattern and a solid spray pattern by changing the fuel pressure. In the hollow spray pattern, the fuel density at the central portion is lower than that outside the central portion. In the solid spray pattern, the fuel density is not significantly different between the central portion and the outside of the central portion.

SUMMARY OF THE INVENTION

The invention provides a fuel injection apparatus for an internal combustion engine capable of changing a spray pattern with a fuel pressure.

An aspect of the invention relates to a fuel injection apparatus for an internal combustion engine. The fuel injection apparatus includes: a fuel injection valve that injects fuel into a cylinder of the internal combustion engine provided with a spark plug in the cylinder; and a fuel pressure control unit that controls a pressure of fuel that is supplied to the fuel injection valve. In the fuel injection apparatus, the fuel injection valve is provided with a plurality of injection holes arranged at intervals in a lateral direction, when a direction in which a central axis of the cylinder extends is a vertical direction, so that the plurality of injection holes are directed radially, and the plurality of injection holes are configured such that, when an angle formed between two adjacent injection axes, among a plurality of injection axes defining the respective injection directions of the injection holes, is an included angle, an included angle formed by two injection axes closest to the central axis of the cylinder is the smallest of all the included angles.

A smaller included angle provides a shorter inter-spray distance than the inter-spray distance in the case of a larger included angle. With the fuel injection apparatus according to the aspect of the invention, a plurality of fuel sprays injected from the respective injection holes are arranged in the cylinder such that an inter-spray distance at the central portion is shorter than that outside the central portion. When the pressure of the fuel supplied to the fuel injection valve is low, the two adjacent fuel sprays do not merge even if the inter-spray distance at the central portion is short. Therefore, when the plurality of fuel sprays are collectively regarded as one fuel spray, the one fuel spray has a hollow spray pattern, in which the fuel density at the central portion is lower than that outside the central portion. When the fuel pressure is high, on the other hand, the inter-spray distance at the central portion becomes even shorter, whereby the two fuel sprays merge. Therefore, the one fuel spray has a solid spray pattern, in which the fuel density is not significantly different between the central portion and the outside of the central portion. Thus, it is possible to change the spray pattern by appropriately controlling the pressure of the fuel that is supplied to the fuel injection valve.

The fuel injection valve may be configured such that, when the plurality of fuel sprays injected from the respective injection holes are collectively regarded as one fuel spray, a specific fuel pressure value, at which a rate of change in a spray length of the one fuel spray changes, falls within a variation range of the fuel pressure. The fuel pressure control unit may control the pressure of the fuel that is supplied to the fuel injection valve so as to switch a fuel state between a state in which the fuel pressure is higher than or equal to the specific fuel pressure value and a state in which the fuel pressure is lower than the specific fuel pressure value depending on an operation state of the internal combustion engine. When the plurality of fuel sprays merge, the penetration of the fuel spray becomes higher and therefore the spray length becomes longer, than when the fuel sprays have not merged. That is, the rate of change in the spray length differs between before and after the fuel sprays merge, so the fuel pressure at which the two fuel sprays at the central portion start merging corresponds to the specific fuel pressure value. Thus, by switching the fuel state between the state in which the fuel pressure is lower than the specific fuel pressure value and the state in which the fuel pressure is higher than or equal to the specific fuel pressure value, it is possible to selectively form the hollow spray pattern and the solid spray pattern. In general, there are an operation state of the internal combustion engine for which the hollow spray pattern is suitable and an operation state of the internal combustion engine for which the solid spray pattern is suitable. Therefore, by changing the fuel pressure depending on the operation state of the internal combustion engine as described above, it is possible to select a spray pattern that is suitable for the operation state of the internal combustion engine.

As described above, in the fuel injection apparatus according to the invention, the plurality of fuel sprays injected from the respective injection holes are arranged in the cylinder such that the inter-spray distance at the central portion is shorter than that outside the central portion. Therefore, it is possible to change the spray pattern by appropriately controlling the fuel pressure.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
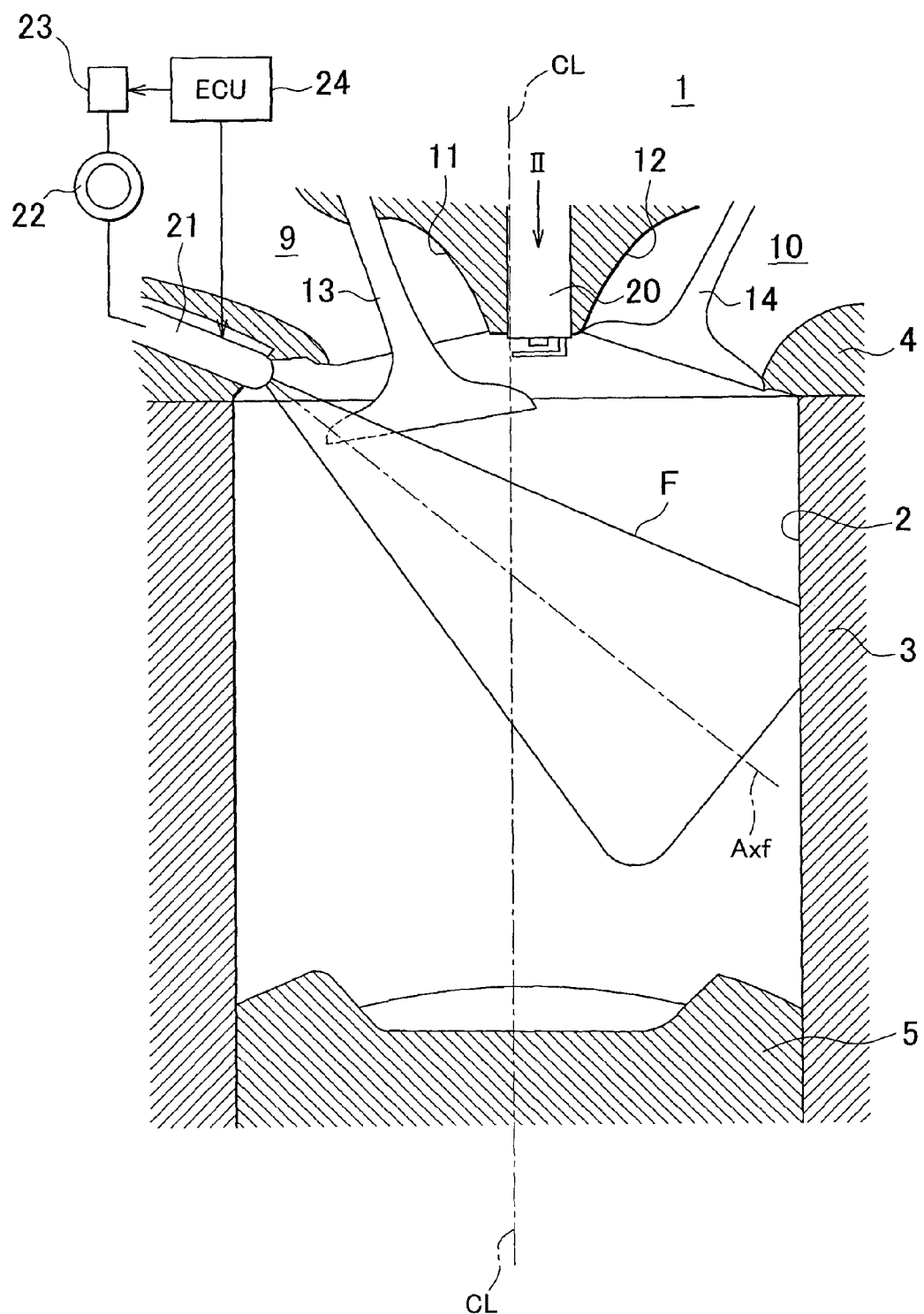
FIG. 1 is a sectional view schematically showing a main portion of an internal combustion engine to which a fuel injection apparatus according to an embodiment of the invention is applied.

FIG. 1 is a sectional view schematically showing a main portion of an internal combustion engine to which a fuel injection apparatus according to an embodiment of the invention is applied. An internal combustion engine 1 is a spark-ignition four-cycle internal combustion engine that can be mounted in a vehicle (not shown) as a traction power source. The internal combustion engine 1 includes a plurality of cylinders 2 (only one of the cylinders 2 is shown in the drawing). The cylinders 2 are formed in a cylinder block 3. An upper end of each cylinder 2 is closed by a cylinder head 4. A piston 5 is provided in each cylinder 2 so as to be capable of reciprocating therein.

An intake passage 9 and an exhaust passage 10 are connected to each cylinder 2. The intake passage 9 includes an intake port 11 formed in the cylinder head 4, and the exhaust passage 10 includes an exhaust port 12 formed in the cylinder head 4. The intake port 11 is opened/closed by an intake valve 13, and the exhaust port 12 is opened/closed by an exhaust valve 14. Although not shown in the drawings, the exhaust passage 10 is provided with a three-way catalyst. Exhaust gas, which is burnt gas, flowing through the exhaust passage 10 is purified by the three-way catalyst.

Figure 2:
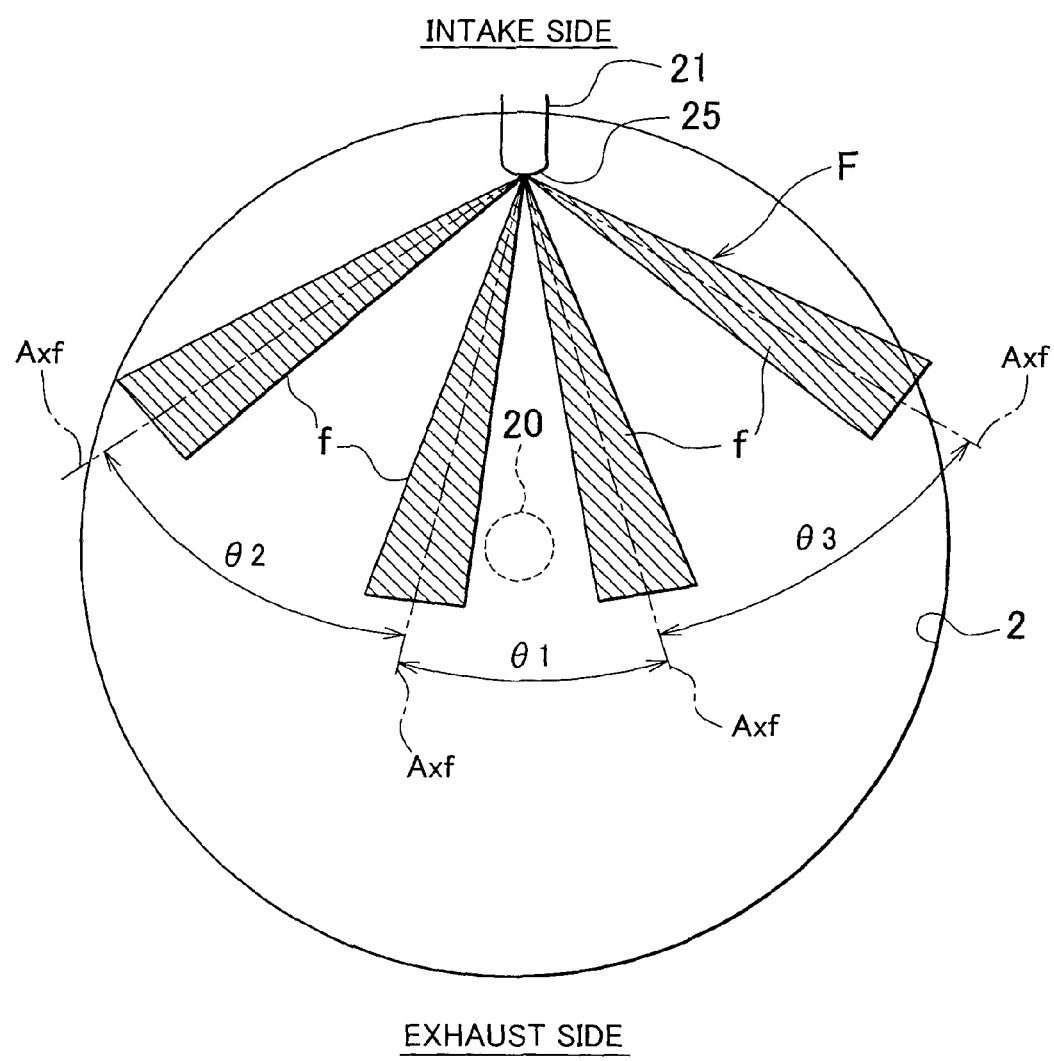
FIG. 2 is a schematic view showing the internal combustion engine of FIG. 1 seen from a direction of an arrow II.

The cylinder head 4 is provided with a spark plug 20 that is disposed at a central portion of the ceiling of the cylinder 2 such that a tip end of the spark plug 20 faces the inside of the cylinder 2. The cylinder head 4 is also provided with a fuel injection valve 21 that extends along the intake port 11 and injects fuel into the cylinder 2. That is, as shown in FIG. 2, the fuel injection valve 21 is arranged so as to be directed from the intake side toward the exhaust side of the cylinder 2. The fuel injection valve 21 is an electromagnetically-driven fuel injection valve, and a tip end thereof is provided with a plurality of injection holes. As shown in FIG. 1, the fuel injection valves 21 provided for respective cylinders 2 are connected to a common delivery pipe 22. Fuel pressurized by an oil pump (not shown) is introduced to the delivery pipe 22. The delivery pipe 22 is provided with a fuel pressure adjusting mechanism 23 that adjusts a pressure of fuel that is supplied to the fuel injection valve 21. The fuel injection valves 21 and the fuel pressure adjusting mechanism 23 are controlled by an engine control unit (ECU) 24. The ECU 24 is a computer for appropriately controlling an operation state of the internal combustion engine 1. The ECU 24 receives, from various sensors (not shown), information indicating the operation state of the internal combustion engine 1 such as a rotation speed. Using such information, the ECU 24 executes various control programs prepared in advance so as to carry out fuel injection controls including injection timing control and injection duration (injection amount) control, and ignition timing control and the like. The controls related to the embodiment of the invention executed by the ECU 24 will be described later.

Figure 3:
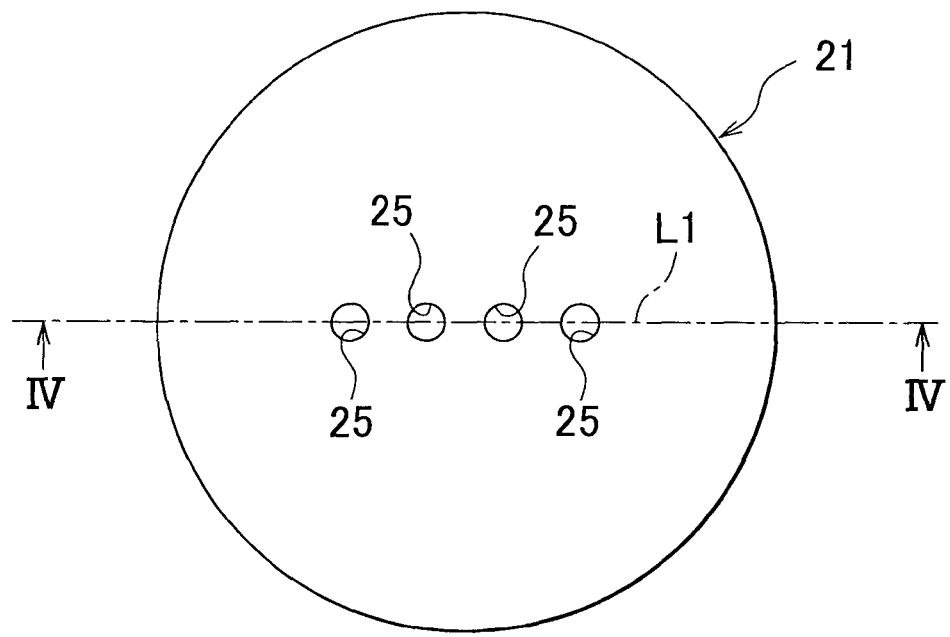
FIG. 3 is a diagram showing a plurality of injection holes that are formed in a fuel injection valve.
Figure 4:
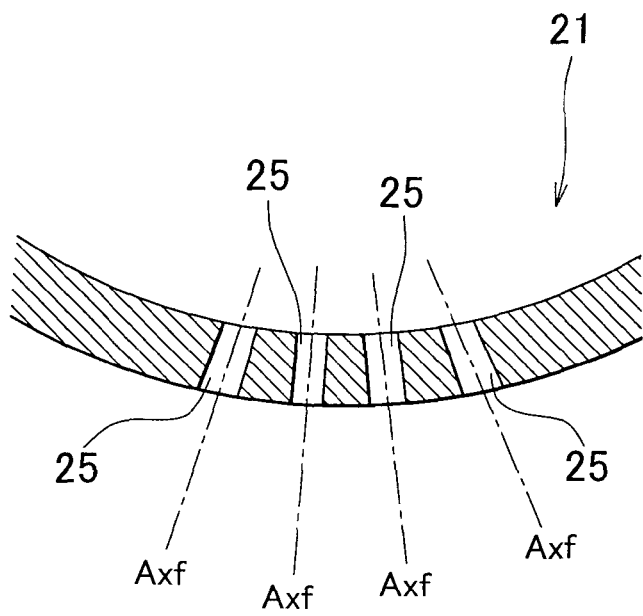
FIG. 4 is a sectional view taken along line IV-IV in FIG. 3.

As shown in FIGS. 3 and 4, the fuel injection valve 21 is provided with a total of four injection holes 25. These injection holes 25 are arranged at intervals in a lateral direction, when a direction in which a central axis CL of the cylinder 2 extends is a vertical direction, so that the injection holes 25 are directed radially. Note that the lateral direction in FIG. 3 corresponds to a direction in FIG. 1 that is perpendicular to the sheet on which FIG. 1 is drawn. In the present embodiment, the injection holes 25 are arranged at regular intervals along a straight line L1 in a plan view. The injection directions of the injection holes 25 as a whole are set to be radial. Since the four injection holes 25 are configured as described above, fuel sprays f from the injection holes 25 are arranged in the cylinder 2 as shown in FIG. 2. Straight lines that define the respective injection directions of the injection holes 25 are referred to as injection axes Axf, and angles each formed by two adjacent injection axes Axf are referred to as included angles $\theta 1$, $\theta 2$, and $\theta 3$. In this case, the included angle $\theta 1$ formed by the two injection axes Axf which are located closest to the central axis of the cylinder 2 is smaller than each of the other included angles $\theta 2$ and $\theta 3$. In the present embodiment, the included angles $\theta 2$ and $\theta 3$ are equal to each other. However, the included angles $\theta 2$ and $\theta 3$ may be different from each other, provided that the included angles $\theta 2$ and $\theta 3$ are each larger than the included angle $\theta 1$ at the central portion.

Figure 5A:
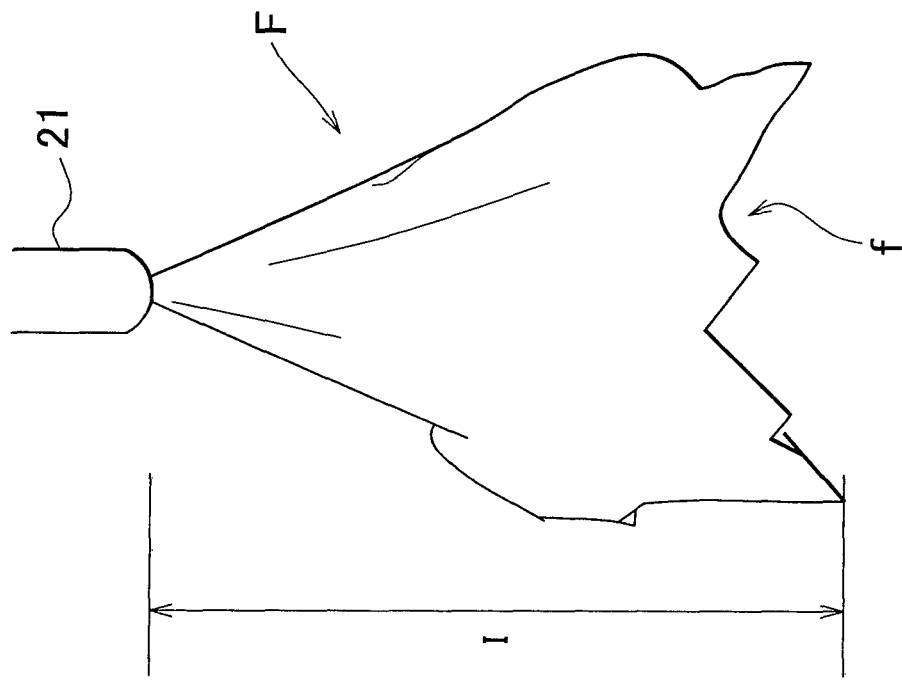
FIG. 5A is a schematic view showing a fuel spray when a fuel pressure is lower than a specific fuel pressure value.
Figure 5B:
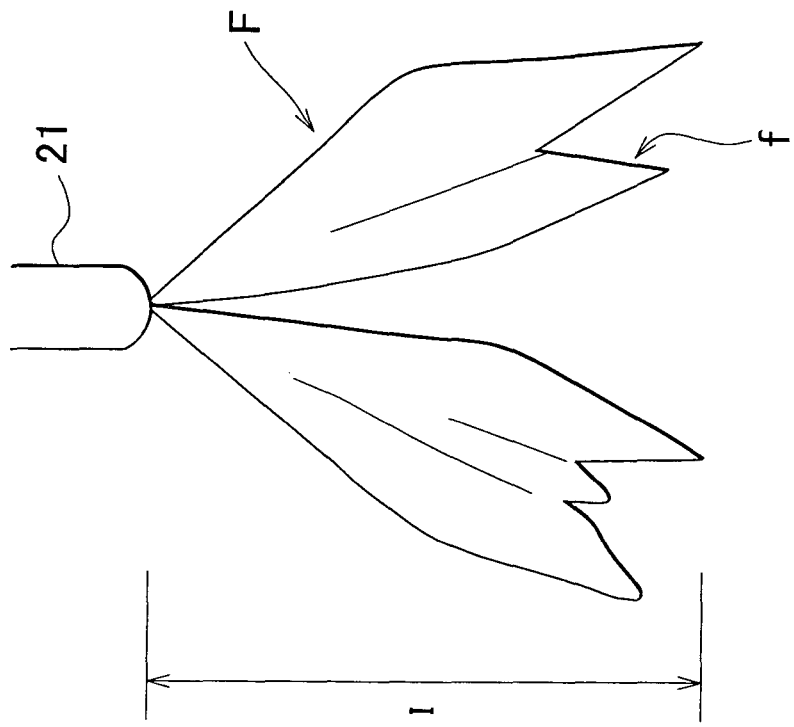
FIG. 5B is a schematic view showing a fuel spray when a fuel pressure is higher than or equal to the specific fuel pressure value.

As can be seen from FIG. 2, a smaller included angle provides a shorter distance between two adjacent fuel sprays (hereinafter, referred to as "inter-spray distance") as compared to the case of a larger included angle. Therefore, the four fuel sprays f injected from the four injection holes 25 are arranged in the cylinder 2 such that the inter-spray distance at the central portion is shorter than the inter-spray distance outside the central portion. With such arrangement of the four fuel sprays f, when the pressure of the fuel supplied to the fuel injection valve 21 is low, the two adjacent fuel sprays do not merge even if inter-spray distance at the central portion is short. Therefore, as shown in FIG. 5A, when the four fuel sprays f are collectively regarded as one fuel spray F, the fuel spray F has a hollow spray pattern, in which the fuel density at the central portion is lower than the fuel density outside the central portion. When the pressure of the fuel supplied to the fuel injection valve 21 is high, on the other hand, the inter-spray distance at the central portion becomes even shorter, whereby the two fuel sprays f merge. Therefore, as shown in FIG. 5B, the fuel spray F has a solid spray pattern, in which the fuel density is not significantly different between the central portion and the outside of the central portion. When the plurality of fuel sprays f merge, the penetration of the fuel spray becomes higher than that before the merge. Thus, as shown in FIG. 5B, a spray length 1 of the fuel spray F after the merge is longer than that before the merge shown in FIG. 5A.

Figure 6:
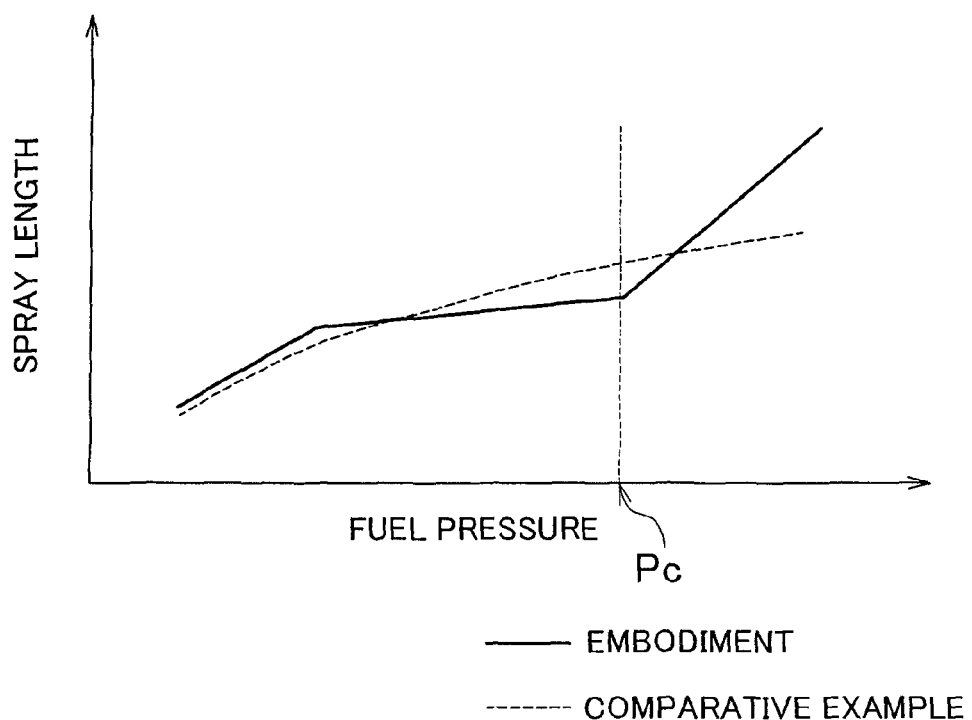
FIG. 6 is a graph showing a relationship between a fuel pressure and a spray length.

FIG. 6 shows a relationship between the fuel pressure and the spray length. In FIG. 6, the solid line indicates the present embodiment, and the broken line indicates a comparative example in which the fuel density is uniform in the lateral direction. As is apparent from FIG. 6, when the pressure of the fuel that is supplied to the fuel injection valve 21 varies, a specific fuel pressure value Pc, at which a rate of change of the spray length changes, falls within the variation range of the fuel pressure. It is conceivable that this specific fuel pressure value Pc corresponds to a fuel pressure, at which the two fuel sprays f at the central portion of the fuel spray F start merging. Thus, by switching a fuel state between a state in which the fuel pressure is lower than the specific fuel pressure value Pc and a state in which the fuel pressure is higher than or equal to the specific fuel pressure value Pc, it is possible to change the spray pattern between the hollow spray pattern shown in FIG. 5A and the solid spray pattern shown in FIG. 5B. In general, there are an operation state of the internal combustion engine for which the hollow spray pattern is suitable and an operation state of the internal combustion engine for which the solid spray pattern is suitable. Thus, by changing the fuel pressure depending on the operation state of the internal combustion engine 1 as described above, it is possible to select a spray pattern that is suitable for the operation state of the internal combustion engine 1.

Next, an example of the fuel pressure controls executed by the ECU 24 will be described. When the internal combustion engine 1 is in a state in which stratified air/fuel mixture should be formed in the vicinity of the spark plug 20 to improve the ignitability, the ECU 24 operates the fuel pressure adjusting mechanism 23 to control the fuel pressure to be lower than the specific fuel pressure value Pc, thereby changing the spray pattern of the fuel spray F to the hollow spray pattern (see FIG. 5A). In this case, a stratified air/fuel mixture in which the fuel concentration is locally high is formed in the vicinity of the spark plug 20. Moreover, since the hollow spray pattern suppresses collision of the fuel with the spark plug 20, misfire of the spark plug 20 is avoided. When the internal combustion engine 1 is in a state in which the output thereof should be increased, the ECU 24 operates the fuel pressure adjusting mechanism 23 to control the fuel pressure to be higher than or equal to the specific fuel pressure value Pc, thereby changing the spray pattern of the fuel spray F to the solid spray pattern (see FIG. 5B). In this case, the penetration of the fuel spray F is high, so the jet flow effect increases the combustion efficiency of the internal combustion engine 1, which contributes to the improvement of the output of the internal combustion engine 1. The combination of the ECU 24 and the fuel pressure adjusting mechanism 23 in the present embodiment functions as a fuel pressure control unit according to the invention.

Figure 7:
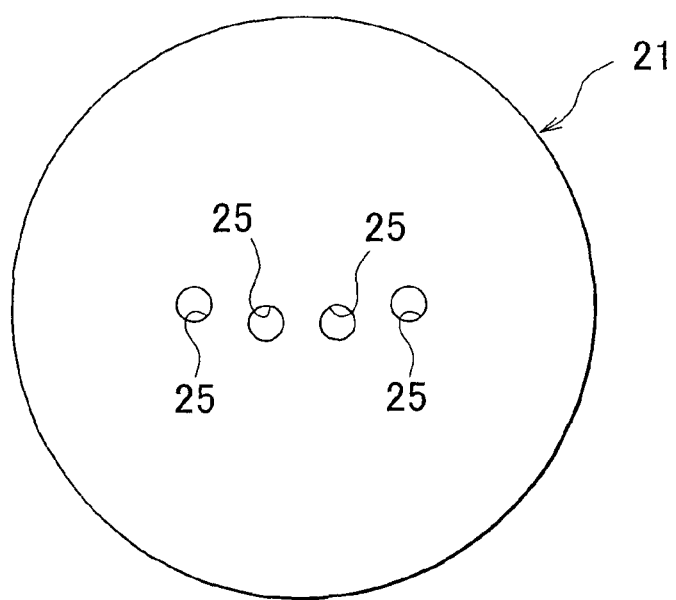
FIG. 7 is a diagram showing a plurality of injection holes formed in a fuel injection valve according to another embodiment.

The invention is not limited to the above embodiment, and may be carried out in various forms within the scope of the invention. In the above embodiment, the four injection holes are arranged in line in a plan view; however, the number of injection holes is not limited. Further, the injection holes need not to be arranged in line, provided that the injection axes extending in the cylinder form the included angles such that the included angle at the central portion is smaller than the other included angles when the cylinder is seen in a plan view from the above. For example, the invention may be implemented in a form in which the four injection holes are not arranged in line in a plan view as shown in FIG. 7. In addition, the plurality of injection holes may be identical or different in size and shape.

The invention claimed is:

1. A fuel injection apparatus for an internal combustion engine, comprising:
    a fuel injection valve that injects fuel into a cylinder of the internal combustion engine provided with a spark plug in the cylinder; and
    a fuel pressure control unit that controls a pressure of fuel that is supplied to the fuel injection valve, wherein:
    the fuel injection valve is provided with a plurality of injection holes arranged at intervals in a lateral direction, when a direction in which a central axis of the cylinder extends is a vertical direction, so that the plurality of injection holes are directed radially;
    the plurality of injection holes are configured such that, when an angle formed between two adjacent injection axes, among a plurality of injection axes defining respective injection directions of the injection holes, is an included angle, the included angle formed by two injection axes closest to the central axis of the cylinder is the smallest of all the included angles;
    the fuel injection valve is configured such that, when a plurality of fuel sprays injected from the respective injection holes are collectively regarded as one fuel spray, a specific fuel pressure value, at which a rate of change in a spray length of the one fuel spray changes, falls within a variation range of the fuel pressure; and
    the fuel pressure control unit controls the pressure of the fuel that is supplied to the fuel injection valve so as to switch a fuel state between a state in which the fuel pressure is higher than or equal to the specific fuel pressure value and a state in which the fuel pressure is lower than the specific fuel pressure value depending on an operation state of the internal combustion engine,
    wherein the rate of change in a spray length over a fuel pressure is higher in a case where the fuel pressure is higher than the specific fuel pressure value than the rate of change in a spray length over a fuel pressure in a case where the fuel pressure is lower than the specific pressure.

* * * * *